United States Patent [19]
Bertram et al.

[11] Patent Number: 6,144,379
[45] Date of Patent: Nov. 7, 2000

[54] COMPUTER CONTROLLED USER INTERACTIVE DISPLAY SYSTEM FOR PRESENTING GRAPHS WITH INTERACTIVE ICONS FOR ACCESSING RELATED GRAPHS

[75] Inventors: Randal Lee Bertram; Frederick Scott Hunter Krauss, both of Raleigh; Margherita LaFauci, Holly Springs, all of N.C.

[73] Assignee: International Business Machines Corporation, Armonk, N.Y.

[21] Appl. No.: 08/975,144

[22] Filed: Nov. 20, 1997

[51] Int. Cl.[7] .............................. G06F 13/00; G06T 11/20
[52] U.S. Cl. ........................... 345/348; 345/440; 345/356
[58] Field of Search .................................... 345/348, 349, 345/969, 440, 433, 356

[56] References Cited

U.S. PATENT DOCUMENTS

| | | | |
|---|---|---|---|
| 4,882,699 | 11/1989 | Evensen | 379/284 |
| 5,093,869 | 3/1992 | Alves et al. | 382/22 |
| 5,261,044 | 11/1993 | Dev et al. | 395/159 |
| 5,276,789 | 1/1994 | Besaw et al. | 395/140 |
| 5,295,244 | 3/1994 | Dev et al. | 395/161 |
| 5,440,722 | 8/1995 | VanderSpek et al. | 395/183.19 |
| 5,483,468 | 1/1996 | Chen et al. | 364/551.01 |
| 5,486,775 | 1/1996 | Veenstra | 126/38 |
| 5,541,854 | 7/1996 | Yundt | 364/551.01 |
| 5,751,933 | 5/1998 | Dev et al. | 395/182.02 |
| 5,819,028 | 10/1998 | Manghirmalani et al. | 395/185.1 |

OTHER PUBLICATIONS

IBM Technical Disclousre Bulletin, vol. 30, No. 12, May 1988 "Layout Algorithm for Computer Network Management Graphics".

IBM Technical Disclosure Bulletin, vol. 35, No. 2, Jul. 1992 "User Interface for Performance Monitor".

*Primary Examiner*—Raymond J. Bayerl
*Assistant Examiner*—David E. Brown
*Attorney, Agent, or Firm*—J. B. Kraft; Joscelyn G. Cockburn

[57] ABSTRACT

A computer managed communication network with user interactive access via a plurality of display terminals and including a plurality of linked network objects with a system for managing said network in which values of a selected parameter are sensed respectively for each of a plurality of selected objects and stored. The stored data is presented in a graph display including a plurality of icons, each icon representing aspects of said values with respect to one of said selected objects. User interactive means for selecting one of said icons are provided together with means responsive to said selecting means for graphically presenting other aspects of said values. In the monitoring of networks, the invention may be used to track network servers which are monitored via a distribution graph in which icons representative of servers are linked to more detailed line graphs of such servers showing the changes in parameter values versus a time line parameter.

27 Claims, 7 Drawing Sheets

COMPUTER CONTROLLED USER INTERACTIVE DISPLAY SYSTEM FOR PRESENTING GRAPHS WITH INTERACTIVE ICONS FOR ACCESSING RELATED GRAPHS

TECHNICAL FIELD

The present invention relates to interactive computer controlled display systems for presenting user interactive graphs and particularly graphs used for interactive management of communication networks.

BACKGROUND OF THE INVENTION

The 1990's decade has been marked by a societal technological revolution driven by the convergence of the data processing industry, the communications industry and the consumer electronics industry. This advance has been even further accelerated by the extensive consumer and business involvement in the internet over the past two years. As a result of these changes, it seems as if virtually all aspects of human endeavor in the industrialized world will potentially involve human-computer interfaces, and especially such interfaces to communication networks such as the internet. As a result of these profound changes, there is a need to make computer directed activities accessible to a substantial portion of the world's population which, up to a year or two ago, was computer indifferent. In order for the vast computer supported market places to continue and be commercially productive, it will be necessary for a large segment of consumers, workers and business people to be involved in computer interfaces. In addition, because of the vast amount of information potentially available through networks such as the internet, there has been an increasing demand on the part of relatively sophisticated users for implementations which make display terminal access to the internet less cluttered and confusing and, of course, easier to use.

The present invention is directed to the problems of providing less cluttered and easier graphical display access to communication networks and particularly to user interactive access for network monitoring and administration purposes. To this end, we developed a process of monitoring through user interactive related displayed graphs which may be used for discrete process monitoring as well as network monitoring.

SUMMARY OF THE INVENTION

The present invention relates to a computer managed communication network with user interactive access via a plurality of display terminals and including a plurality of linked network objects. The invention provides a system for managing said network comprising means for sensing values of a selected parameter, respectively for each of a plurality of selected objects and for storing data representing said values. Also included are means for presenting the stored data in graphs on display. The graphs include a plurality of icons; each icon represents aspects of said dynamic values with respect to one of said selected network objects being monitored. The icons may then be interactively accessed by a user to select one of said icons and in response to the selection, other aspects of said dynamic values are graphically presented in the case where the user monitoring the network needs more information. In network management, the present system is advantageously used where the network objects being monitored are network servers.

In accordance with another aspect of this invention, the initial graphs used in the monitoring may present the object values on a distribution graph based on a selected time interval and the means for presenting other aspects of said dynamic values change said time interval.

The present invention also comprehends embodiments wherein the other aspects being presented in response to user icon selection may involve the graphing of values of other object and process parameters.

In addition to the monitoring of computer network processes, the present invention may be directed to monitoring of standalone computer operation parameters as well as to computer controlled industrial or commercial processes.

DETAILED DESCRIPTION OF THE PREFERRED EMBODIMENT

Figure 1:
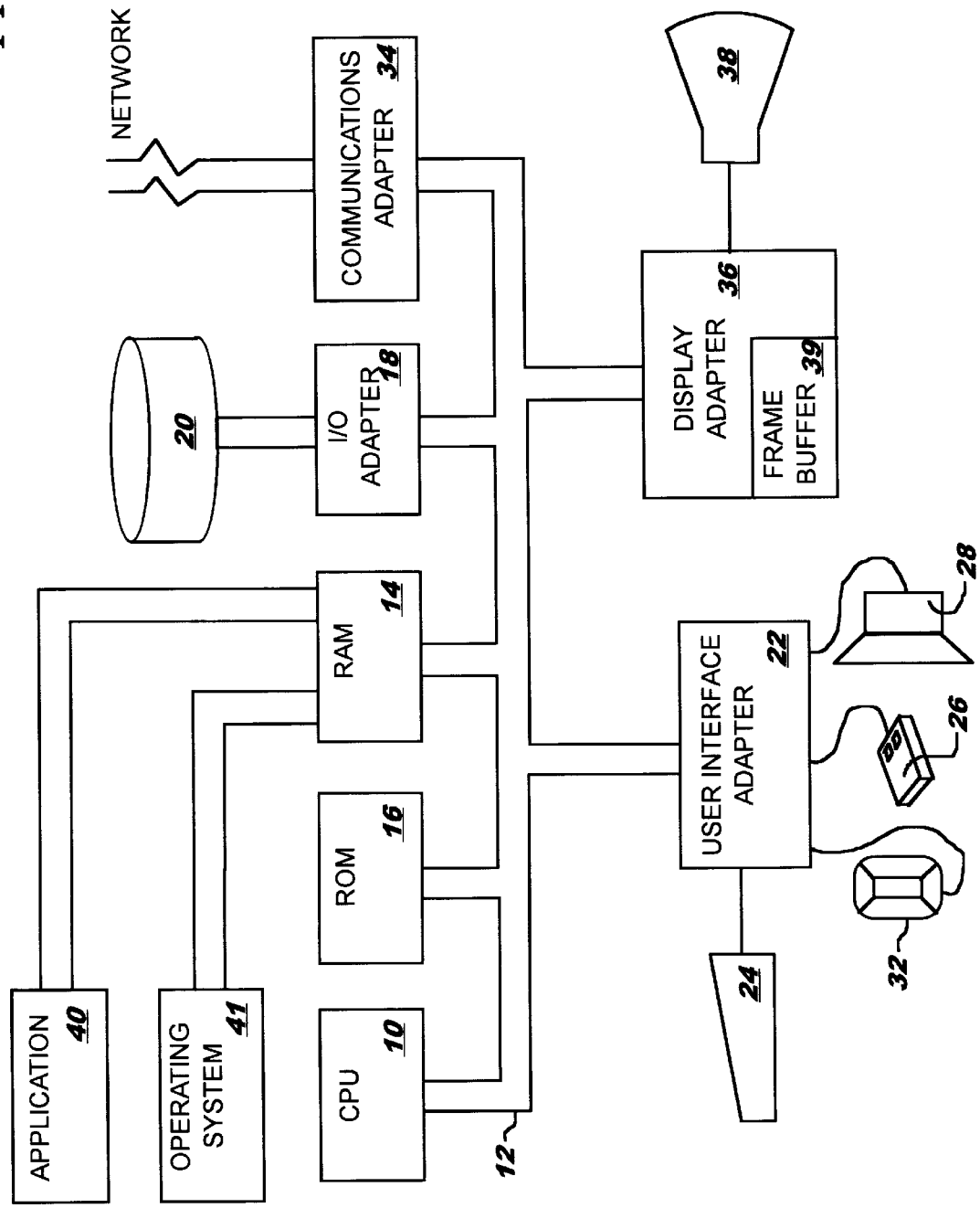
FIG. 1 is a block diagram of a data processing system including a central processing unit which is capable of implementing the transient display of the present invention.

Before going into the details of specific embodiments, it will be helpful to understand from a more general perspective the various elements and method which may be used to implement the present invention. Since a major phase of the present invention is directed to the monitoring and management of network objects and their parameters, an understanding of networks and their operating principles would be helpful. We will not go into great detail in describing the networks to which the present invention is applicable. U.S. Pat. No. 5,295,244, Dev et al. and U.S. Pat. No. 5,353,399, Kuwamoto et al. adequately detail conventional networks to which the present invention would be applicable including appropriate network management and display terminal access to such networks. Reference has also been made to the applicability of the present invention to a global network such as the internet. For details on internet nodes, objects and links, reference is made to the text, Mastering the Internet, G. H. Cady et al., published by Sybex Inc. Alameda, Calif., 1996.

Any data communication system which interconnects or links computer controlled systems or network objects at various sites or network nodes defines a communications network. A network may be as simple as two linked computers or it may be any combination of LANS (Local Area Networks) or WANS (Wide Area Networks). Of course, the internet is a global network of a heterogeneous mix of computer technologies and operating systems. At each level in a network hierarchy, the unit may be considered as a network object. For example, since the internet connects networks of computers, a particular corporate network could be an internet object. Then the particular LAN of each department in the corporate network would be an object. At high levels, regional networks representative of cities could be objects. Likewise, computer controlled objects could be linked together by function to form networks which in turn could be linked into the internet backbone as network objects characterized by functions as accounts receivable/ payable or video-on-demand distribution. Higher level objects are linked to the lower level objects in the hierarchy through a variety of network server computers. These network servers are the key to network control and distribution. Accordingly, network and system administrators need the ability to monitor server performance over various periods of time. Servers, whether they are Web, file or application, may be measured by a large number of performance parameters, e.g., CPU utilization, memory I/O, port I/O, amount of memory used, physical drive workload and other information processing parameters. With respect to these, network administrators, particularly with respect to the internet, must be responsible for managing trouble shooting and planning for the future needs of hundreds of network servers in their portion of the network. These tasks are huge in view of the great numbers of servers which must be controlled as well as the large number of performance parameters for the servers. Administration is done through computer controlled interactive display terminals. In order for users and administrators to take corrective actions, they must be able to compare short and long term performance trends for the various parameters, identify which servers are performing well and make detailed comparisons of various parameters between large numbers of servers. Such comparisons enable the administrator to determine which servers are capable of handling additional workload which could be off loaded from other over used servers.

However, traditional line graphs which may be displayed for plotting the variation of various server parameters against time or other parameters become chaotic because of the great number of servers being monitored. There is a limitation as to the number of such curves which may be plotted on a display screen before extreme visual clutter results making it impossible for the user to extract meaningful information. We have found that 5 or 6 curves representative of parameters of a single server is the maximum. As will be seen hereinafter in greater detail, the present invention provides a system for simplifying the user interface graphics presented to the user who, in the case of the present embodiment, may be the network administrator. The system involves representing the objects being monitored as interactive icons in simplified graphs which are user-interactively linked to related graphs through the user selection of the object icons. In the related graphs, the objects may still remain represented by interactive icons through which the objects and their parameters may be interactively linked to other graphs. Following the lexicons of hypertext and hypermedia, the present linkages may be considered as hypergraphs. Thus, it should be understood that while we describe our system in an embodiment of managing network servers, the invention also comprehends the simplification of graphic interfaces to management of any complex data processing, chemical processing, manufacturing or business process which has many objects being monitored which have many significant parameters requiring monitoring. From the present description, it should be clear how such processes may be controlled through the linked simplified graphs of the present invention.

For convenience in description of the operation of the various icon linked "hypergraphs" implementations of the present invention, simple examples of network objects and parameters may be used. It will be understood that the implementations should be equally applicable in the control of more complex object parameters.

Referring to FIG. 1, a typical data processing system is shown which may function as the computer controlled display terminal used in implementing the network monitoring, managing and graph control functions in the present invention. A central processing unit (CPU) such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS or the OS/2 operating system available from International Business Machines Corporation (OS/2 is a trademark of International Business Machines Corporation). A programming system monitoring and management application 40 to be subsequently described in detail runs in conjunction with operating system 41 and provides output calls to the operating system 41 which implement the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN) which includes, of course, the internet. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the transient displays of the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38. In the preferred embodiment, which will be subsequently described, the mouse will be the input means by which the user, e.g., network administrator, will interface with the system. The display terminal of FIG. 1 communicates with the network, such as the internet, through communications adapter 34.

Figure 2:
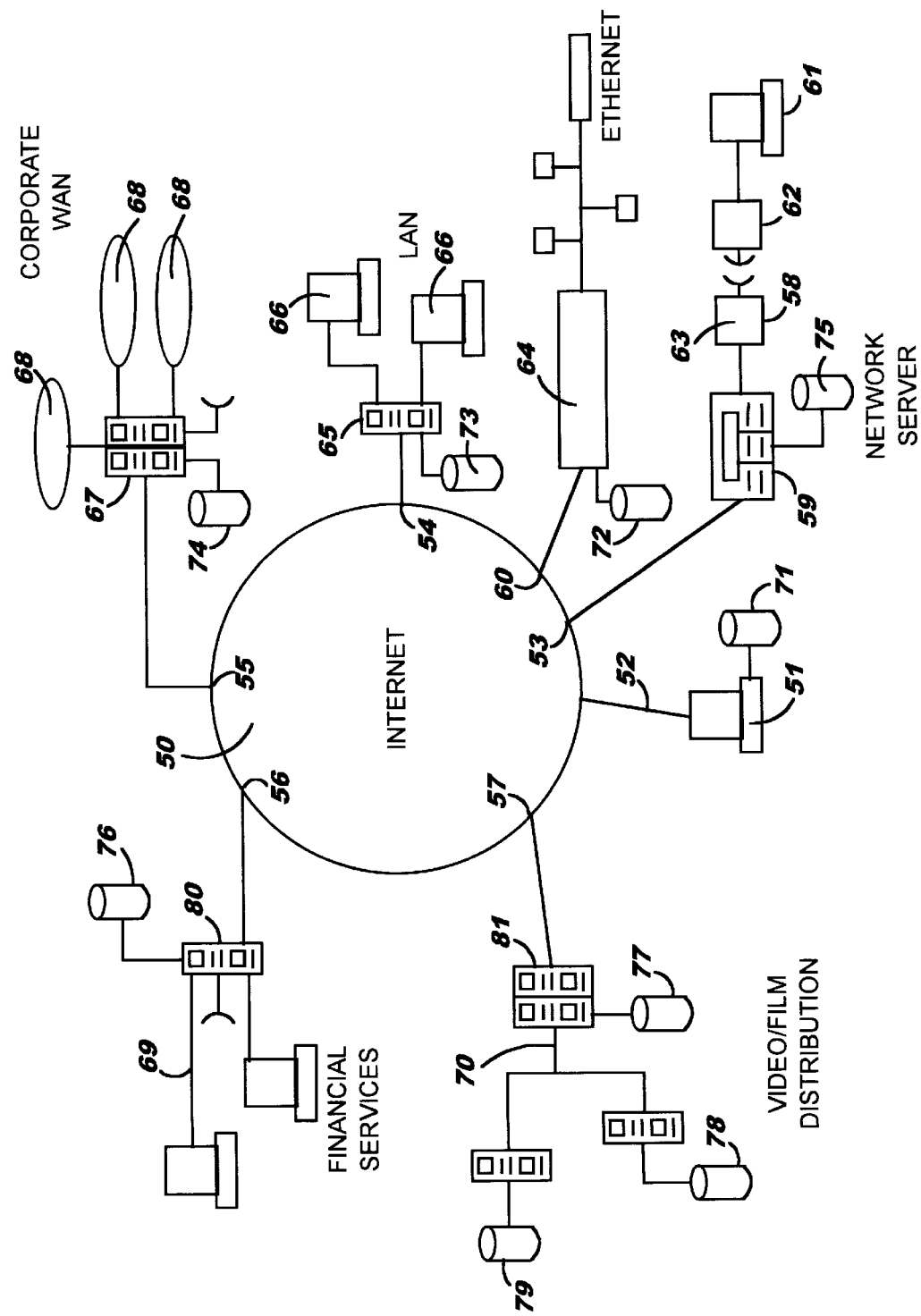
FIG. 2 is a generalized diagrammatic view of an internet portion upon which the present invention may be implemented.

A generalized diagram of a portion of an internet to which the computer controlled display terminal 51 used multilevel hypergraph network management system of the present invention is connected is shown in FIG. 2. Terminal 51 is the computer system shown in FIG. 1 and connection 52 (FIG. 2) is the network connection shown in FIG. 1. Some typical major objects connected to the net are user network 58 connected through server 59 at node 53. In such a server network, the individual users' workstations 61 are connected through telephone modems 62 and 63 to the server 59. Among the other illustrative network objects are ethernet 64 at node 60 and a LAN at node 54 consisting of server 65 and workstations 66. At node 55, the connected object is a corporate WAN consisting of network server 67 and sub-networks 68. In addition, functional networks such as financial services network 69, connected via server 80 and video/film distribution network 70, connected via server 81 respectively at nodes 56 and 57 are typical network objects. It should be noted that a variety of databases, 71 through 79, are shown respectively associated with network objects at various levels. These databases represent the various locations and repositories at which parameters and parameter values which may be used to form the hypergraphs in accordance with the present invention are stored. Thus, when the obtaining or fetching of parameter values are subsequently described, it should be understood that they may be obtained from such databases or combination of databases throughout the network using any conventional network expedient for obtaining data.

Figure 6:
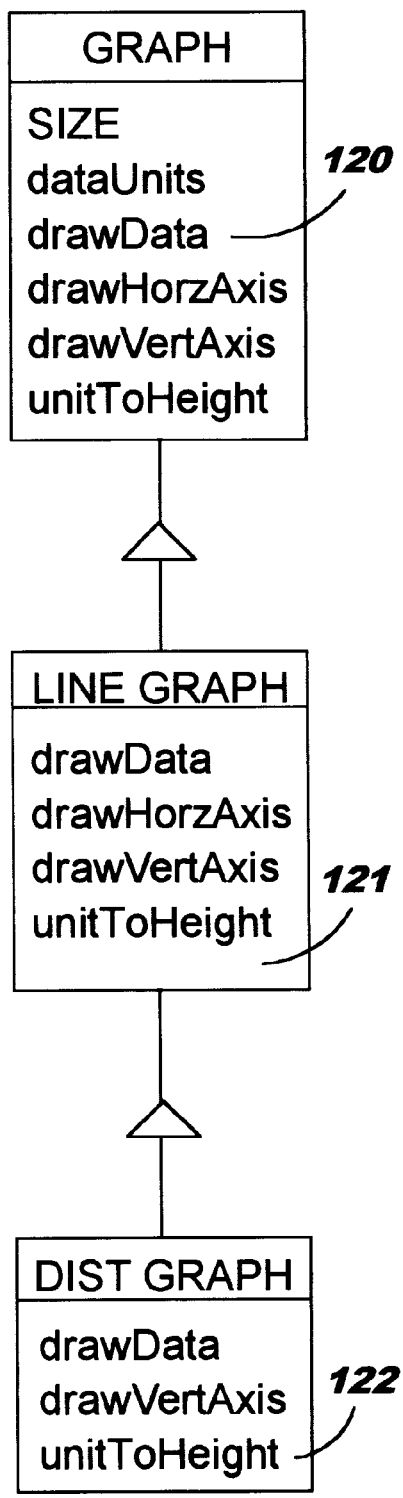
FIG. 6 is a chart showing the units of an object oriented program used to create and maintain the graphs of FIGS. 4 and 5.

There will now be described a simple illustration of the present invention with respect to the display screens of FIGS. 3 and 4. When the screen images are described, it will be understood that these may be rendered by storing an icon creation program such as those in Windows 95 or OS/2 operating systems in RAM 14 of the system of FIG. 1. The operating system is diagrammatically shown in FIG. 1 as operating system 41. Similarly, the layouts of the graphs may be created by any conventional object oriented modeling technique, such as those to be subsequently described in greater detail with respect to FIG. 6.

Figure 3:
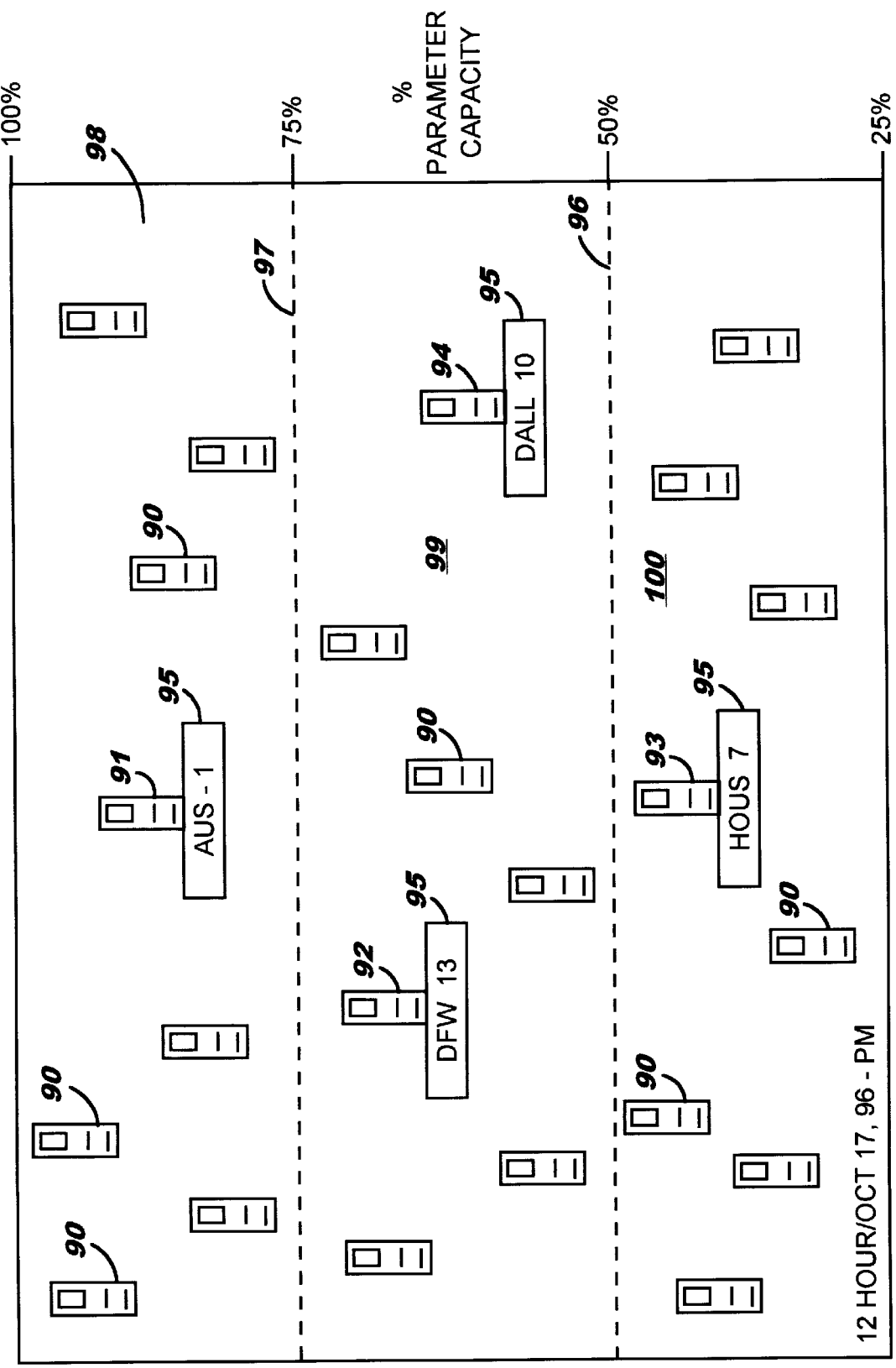
FIG. 3 is a diagrammatic view of a displayed distribution graph showing the distribution of values of a selected parameter for a plurality of network servers.

With respect to FIG. 3, there is shown an example of a graph used for monitoring a single parameter which for this example will be % of storage capacity used up on a network server. We are using servers for the present embodiment because, as stated earlier, the great advantages of the present invention will be realized in network monitoring. Other network parameters may be CPU utilization, memory I/O, port I/O and physical drive workloads, as well as various information distribution traffic parameters. Each one of the network objects, e.g. servers being monitored, is designated by an icon 90. In FIG. 3 only a relatively small number of the servers 90 which could potentially be monitored in a network such as the internet are shown. The graph is a distribution graph showing only the distribution of a single parameter, % of storage capacity used which is measured or distributed based on the vertical position of the server icons 90 with respect to the Y axis. The horizontal positions of the respective icons 90 have no measurable values, they merely serve to spread out the icons to thereby make them more interactively accessible rather than clumped together at their vertical positions. A convenient horizontal icon positioning algorithm will be subsequently described with respect to FIG. 5. The graph of FIG. 3 is in effect a "snap-shot" of the distribution of the parameter monitored over a selected time period which in the example of FIG. 3 is a 12 hour period. The vertical level of the server icons 90 on the graph is based upon the average value of the % storage capacity for each server monitored over the 12 hour period. The time periods between the graphs in the sequence may vary: weeks, days, hours, minutes and even seconds between snap-shot graphs may be appropriate dependent upon the processes and parameters being monitored. Through a sequence of these snap-shot graphs, the user may conveniently track isolated parameters of a process without a cluttered and confusing display screen. One may readily imagine how confusing and cluttered the screen of FIG. 3 would be if each of the over 20 servers being monitored would be represented by even a simple line graph mapping changes in the % capacity parameter against time. It is the ability of the present invention, to select any one of the server icons 90 and thus to be linked to a graph at a next level, i.e. "hypergraph", which avoids such cluttered and confusing screens.

The display screen of FIG. 3 is laid out with a pair of dividing lines 96 and 97 which breaks the screen up into three zones 98, 99 and 100 to help the user monitoring the screen. In this example, let us assume that zone 100 is the safe operational zone for the parameter, zone 99 is safe but transitional and zone 98 is a critical zone where the storage associated with the servers represented by icons 90 is reaching capacity and some action may be needed. The server icons 90 may be shown without any alphanumeric identifiers in order to keep the screen as uncluttered as possible. When needed, the identifiers may be brought up, for example, by any conventional means such as moving a cursor via mouse control to hover over the icon for a given time to cause the id. to appear. Note in FIG. 3, icons 91, 92, 93 and 94 have ids. 95 respectively associated with each.

In the present example, let us assume that the user is concerned about server 91 in critical zone 98 which has been identified as AUS-1; he may then select server icon 91 for a line graph by any conventional mouse clicking technique. FIG. 4 is the screen of FIG. 3 after the user has made such a selection of server 91. Linked graph 101, which is a line graph showing the profile of the % storage capacity used over a time parameter along the X axis is brought up in window 102. Window 102 may be formed by any conventional windowing system such as Windows 95 or OS/2. Thus, the user has a line graph in which an icon 103 representative of server AUS-1 is graphed, in this case hourly, to show changes over a 12 hour period. The linked graph concept may be applied even further by linking the line graph shown in FIG. 4 even further. Assume that the user wishes to graphically look at a parameter of server AUS-1 which may be related to the storage % parameter at 3 PM by clicking on icon 103', the user may bring up a line graph (not shown) for a related parameter such as memory I/O.

Figure 4:
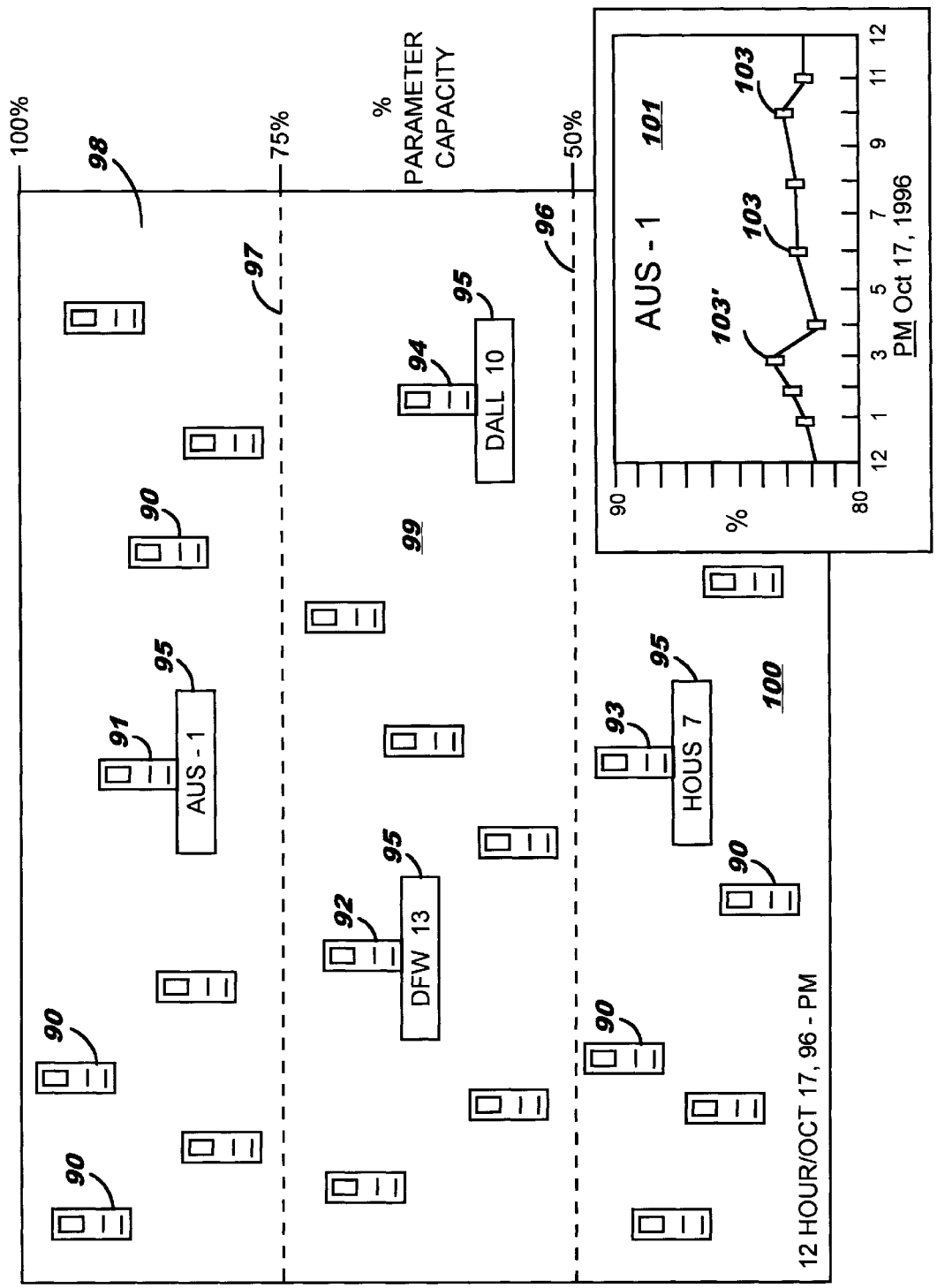
FIG. 4 is a diagrammatic view of FIG. 3 after an object has been selected for graphing the selected parameter values with respect to time and the resulting graph is displayed supplementary to the basic distribution graph.

It also should be noted that at any time in the monitoring in either FIGS. 3 or 4 the user may change the time increments of the distribution graph of FIG. 3 by selecting icon linkages to distribution graphs of the parameter under study over different time units or line graphs such as 101 in FIG. 4 over different time units.

Figure 5:
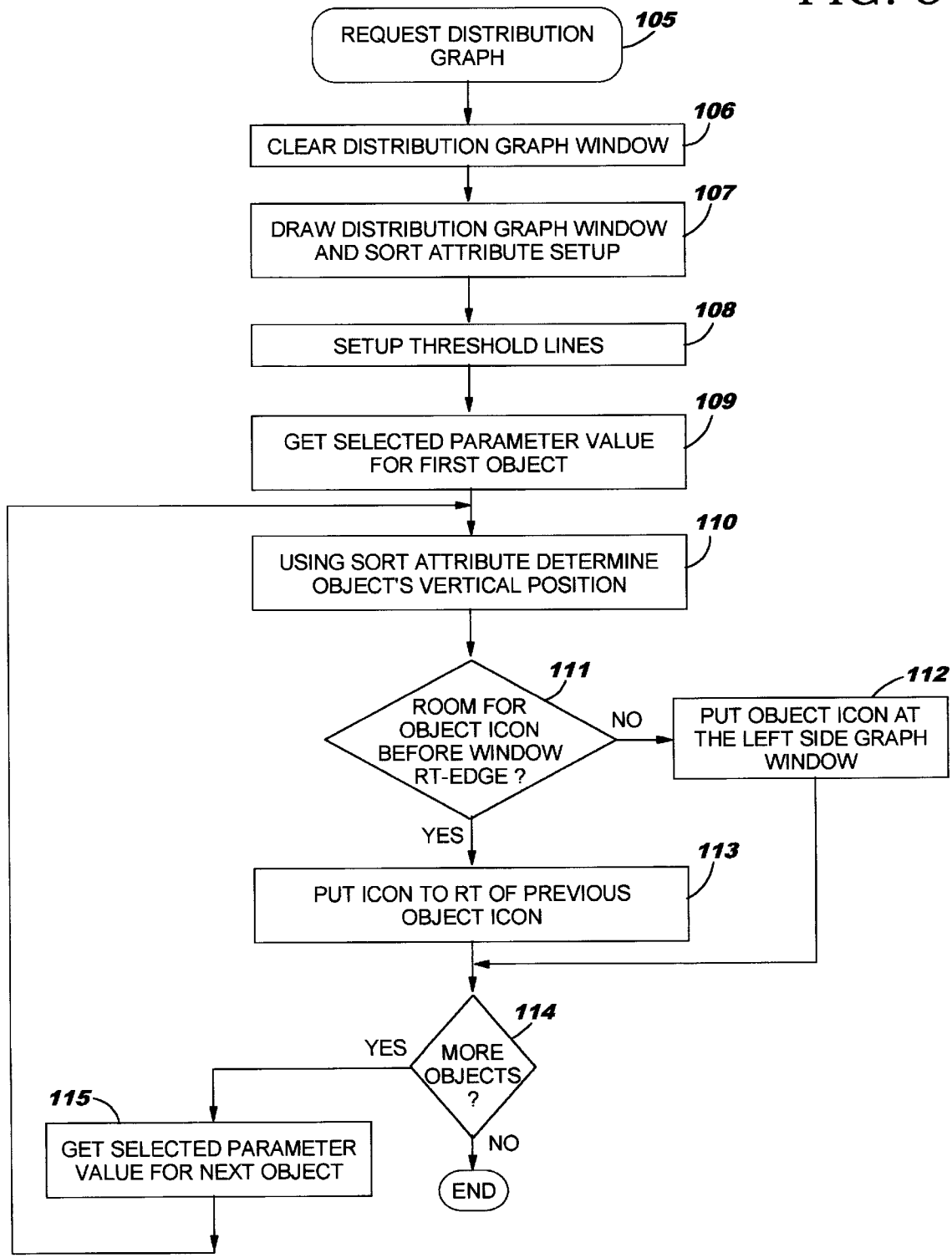
FIG. 5 is a flow chart of the program process for creating the distribution graph shown in FIG. 3.

Now, with respect to FIG. 5, we will describe how a typical parameter distribution graph window such as that of FIG. 3 may be set up using conventional windows. A distribution graph is requested, step 105. A window space such as that used in FIG. 3 is cleared, step 106. Then, step 107, the distribution graph is laid out including Y axis parameter increments and a sort attribute is set up which will subsequently be used to determine the server icon's 90 vertical position on the distribution graph. Threshold lines 96 and 97, FIG. 3, are set up on the graph, step 108. Then, step 109, the selected parameter value for the first server is gotten and, using the above mentioned sort attribute, the vertical position of the icon representing the first server is calculated, step 110.

We had stated earlier that the horizontal positions of server icons 90 should be such that icons at the same level are arranged so that there is no clustering. Thus, with each new icon determined by the sort to be at a particular vertical level, a determination is made, decision step 111, as to whether there is room for icon before the right edge in FIG. 3. If yes, then the icon is put to the right of the previous icon at the level, step 113. If no, then the server icon is put at the left side of the graph. After steps 112 or 113, a determination is made as to whether there are anymore server icons to be positioned, decision step 114. If yes, then the selected parameter value for the next server is gotten, step 115, and the flow is returned to step 110 where the sort attribute is used to calculate the vertical position of the icon representing the next server and the process is continued. When there are no more object icons to be placed as determined by step 114, then the process is ended and the distribution graph of FIG. 3 is complete. What we have presented above is a very simple algorithm to prevent clustering. It certainly serves the purpose of the present invention. However, it should be understood that other more sophisticated algorithms may be used. For example, the icons at the same height level on the graph of FIG. 4 could be arranged from right to left based upon some additional parameter value of the objects represented by the icons.

As stated earlier, the distribution graph of FIG. 3 or the line graph of FIG. 4 are drawn using conventional object oriented units with some modification. This will be described with respect to FIG. 6. The basic object from which the objects used to create the graphs of the present invention are derived is the basic graph object 120 which has: a size function which determines the height and width of a graph; a dataUnits function which defines the Y axis units being monitored such as % storage; a drawData routine which draws the data on the graph; drawHorzAxis and drawVertAxis which respectively draw the horizontal and vertical axes and associated grid lines and the unitToHeight function which calculates the vertical position of each icon dependent upon the value of its selected parameter. The LineGraph object 121 which is used to draw the line graph 101 of FIG. 4 inherits all of the functions of the basic graph object 120 (FIG. 6), except that it overrides the standard UnitoHeight function for its own implementation. The distribution graph 122 object (FIG. 6) inherits from the line graph object 121 except that it uses its own draw data functions and needs to do nothing for drawing the horizontal axis except that it overrides the standard UnitoHeight function for its own implementation as described above with respect to FIG. 5.

Figure 7:
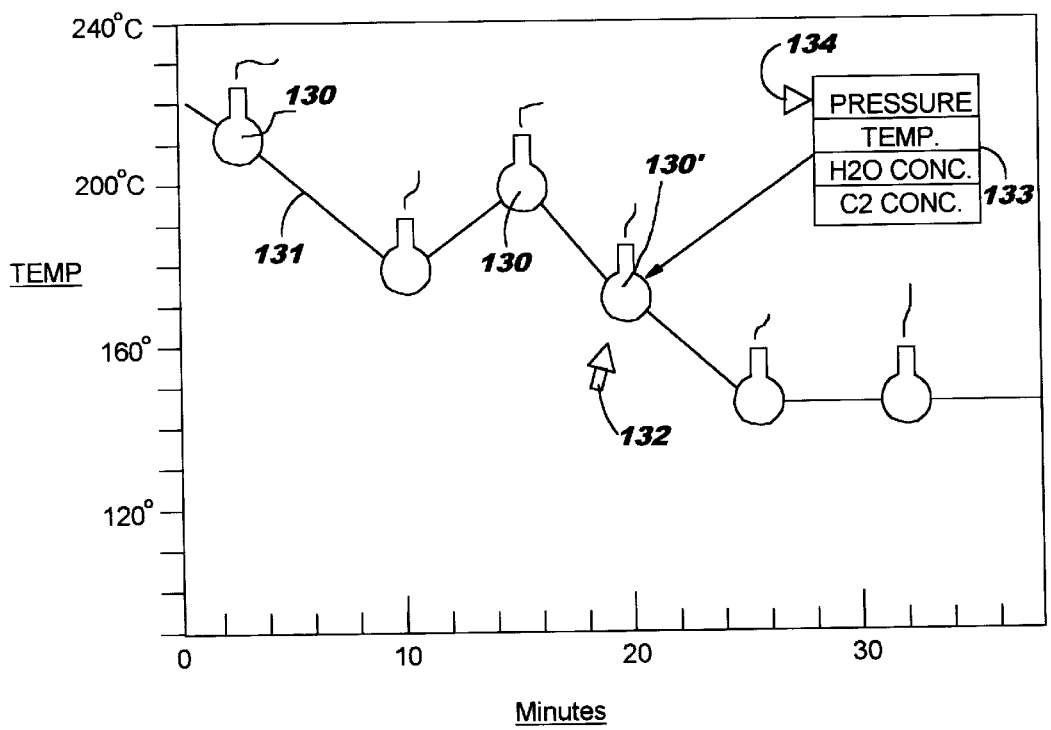
FIG. 7 is a diagrammatic view of a display screen illustrating how aspects of the present invention may be used for the standalone monitoring and control of a simple chemical process.
Figure 7A:
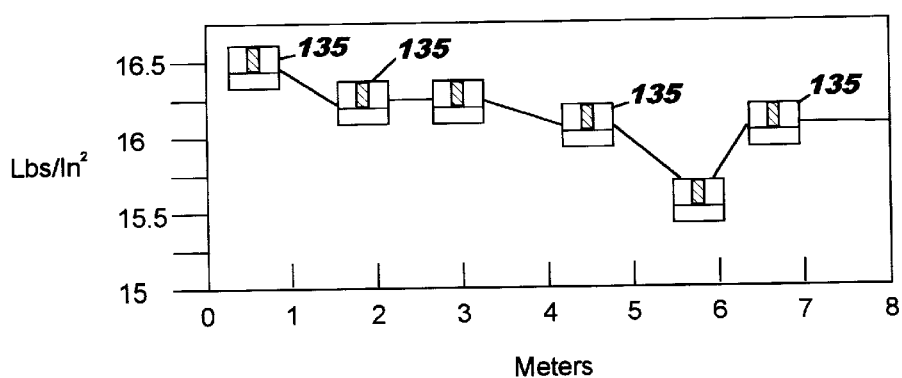
FIG. 7A is a diagrammatic view of a display screen like that of FIG. 7 at a subsequent stage in the monitoring and control of the process of FIG. 7.

The above embodiments of the present invention have been described with respect to monitoring of objects in networks. Many of the expedients are equally applicable to monitoring of localized functions. By way of example, we will describe with respect to FIGS. 7 and 7A how the principles of the present invention could be applicable to monitoring a chemical process. In the line graph of FIG. 7, the temperature of a chemical process is monitored over a period of minutes. Icons 130, representative of the particular chemical process, are plotted as points along a line graph plotting temperature against time. Let us assume that at particular point in the line graph represented by icon 130', the user feels that he needs information on other parameters of the chemical process. Using a mouse, he selects icon 130' via cursor. This results in the appearance of menu 133 associated with icon 130 which lists other graphs of the chemical process parameters to which the graph of FIG. 7 is linked. The user selects pressure by means of slider indicator 134. As a result of this selection, the linked pressure distribution graph of FIG. 7A appears. The graph is a profile of the pressure distribution over a distance of 8 meters in the chemical process as monitored by pressure sensors which could be disposed along a process feed line or at a particular level in a reaction tank. The profile of pressure in FIG. 7A is taken at the 20 minute time point as represented by temperature icon 130'. Icons 135 representative of the chemical process are plotted as points along a graph plotting pressure against distance at the fixed 20 minute time. Thus, by clicking on icon 130' and making a selection from menu 133, the user is linked to a parameter such as pressure or temperature but in a dimension other than time, i.e. distance while time remains fixed.

Like the icons 130 of FIG. 7, the icons 135 of FIG. 7A may be selected and clicked on to obtain other linked graphs of other related parameters. In addition, the icons in the graphs could be used to link the user to other types of displays showing point to point relationships of dynamic parameters, e.g. table displays could satisfy this function.

Although certain preferred embodiments have been shown and described, it will be understood that many changes and modifications may be made therein without departing from the scope and intent of the appended claims.

What is claimed is:

1. A data processor controlled user interactive display system for monitoring and displaying at least one parameter of a dynamic process comprising:

means for sensing dynamic values of said parameter, means for storing data representing said values, means for graphically presenting said stored data on said display including a plurality of graphically related icons, each representing aspects of said dynamic values, user interactive means for selecting one of said icons, and means responsive to said selecting means for graphically presenting other aspects of said dynamic values.

2. The interactive display system of claim 1 wherein:

the process being monitored involves a plurality of objects, said plurality of icons each respectively represent one of said plurality of objects, and said values are values of said parameter respectively for each of said objects.

3. The interactive display system of claim 2 wherein the other aspects of said dynamic values include changed dynamic increments.

4. The interactive display system of claim 2 wherein said means for presenting other aspects of said dynamic values include:

means for graphing the dynamic values with respect to the values of another parameter of said process.

5. The interactive display system of claim 4 wherein said other parameter is time.

6. In a computer managed communication network with user interactive access via a plurality of display terminals and including a plurality of linked network objects, a system for managing said network comprising:

means for sensing values of a selected parameter, respectively for each of a plurality of selected objects means for storing data representing said values, means for graphically presenting said stored data on said display including a plurality of graphically related icons, each icon representing aspects of said values with respect to one of said selected objects, user interactive means for selecting one of said icons, and means responsive to said selecting means for graphically presenting other aspects of said values.

7. The computer managed communication network of claim 6 wherein said plurality of selected objects are a plurality of network servers.

8. The computer managed communication network of claim 6 wherein:

said means for graphically presenting said data present said values on a distribution graph based on a selected time interval, and said means for presenting other aspects of said values change said time interval.

9. The computer managed communication network of claim 7 wherein:

said means for graphically presenting said data presents said values on a distribution graph based on a selected time interval, and said means for presenting other aspects of said values change said time interval.

10. The computer managed communication network of claim 6 wherein said means for presenting other aspects of said values include:

means for graphing the values with respect to the values of another parameter of said process.

11. A computer implemented user interactive method for monitoring and displaying at least one parameter of a dynamic process comprising:

sensing dynamic values of said parameter, storing data representing said values, graphically presenting said stored data on said display including a plurality of graphically related icons, each representing aspects of said dynamic values, user interactively selecting one of said icons, and graphically presenting other aspects of said dynamic values in response to said selection.

12. The method of claim 11 wherein:

the process being monitored involves a plurality of objects, said plurality of icons each respectively represent one of said plurality of objects, and said values are values of said parameter respectively for each of said objects.

13. The method of claim 12 wherein the other aspects of said dynamic values include changed dynamic increments.

14. The method of claim 12 wherein said step of presenting other aspects of said dynamic values includes graphing the dynamic values with respect to the values of another parameter of said process.

15. The method of claim 14 wherein said other parameter is time.

16. In a computer managed communication network with user interactive access via a plurality of display terminals and including a plurality of linked network objects, a method for managing said network comprising:

sensing values of a selected parameter, respectively for each of a plurality of selected objects storing data representing said values, graphically presenting said stored data on said display including a plurality of graphically related icons, each icon representing aspects of said values with respect to one of said selected objects, user interactively selecting one of said icons, and graphically presenting other aspects of said values in response to said selection.

17. The method of claim 16 wherein said plurality of selected objects are a plurality of network servers.

18. The method of claim 16 wherein:

said step of graphically presenting said data includes presenting said values on a distribution graph based on a selected time interval, and said step of presenting other aspects of said values includes changing said time interval.

19. The method of claim 17 wherein:

said step of graphically presenting said data includes presenting said values on a distribution graph based on a selected time interval, and said step of presenting other aspects of said values includes changing said time interval.

20. The method of claim 16 the step of presenting other aspects of said values includes graphing the dynamic values with respect to the values of another parameter of said process.

21. A computer program having data structures included on a computer readable medium for monitoring and displaying on a data processor supported display of at least one parameter of a dynamic process comprising:

means for sensing dynamic values of said parameter, means for storing data representing said values, means for graphically presenting said stored data on said display including a plurality of graphically related icons, each representing aspects of said dynamic values, user interactive means for selecting one of said icons, and means responsive to said selecting means for graphically presenting other aspects of said dynamic values.

22. The computer program of claim 21 wherein:

the process being monitored involves a plurality of objects, said plurality of icons each respectively represent one of said plurality of objects, and said values are values of said parameter respectively for each of said objects.

23. The computer program of claim 22 wherein the other aspects of said dynamic values include changed dynamic increments.

24. The computer program of claim 22 wherein said means for presenting other aspects of said dynamic values include means for graphing the dynamic values with respect to the values of another parameter of said process.

25. The computer program of claim 4 wherein said other parameter is time.

26. A data processor controlled user interactive display system for monitoring and displaying at least one parameter of a dynamic process comprising:

means for sensing dynamic values of said parameter, means for storing data representing said values, means for graphically presenting said stored data on said display including a plurality of graphically related icons, each representing aspects of said dynamic values, user interactive means for selecting one of said icons, and means responsive to said selecting means for presenting a table comparing said dynamic values with respect to another parameter of said process.

27. A computer implemented user interactive method for monitoring and displaying at least one parameter of a dynamic process comprising:

sensing dynamic values of said parameter, storing data representing said values, graphically presenting said stored data on said display including a plurality of graphically related icons, each representing aspects of said dynamic values, user interactively selecting one of said icons, and presenting a table comparing said dynamic values with respect to another parameter of said process in response to said selection.

* * * * *